June 5, 1945. W. R. WISNER 2,377,536
GLASS TEMPERING APPARATUS
Filed Dec. 11, 1941 3 Sheets-Sheet 1
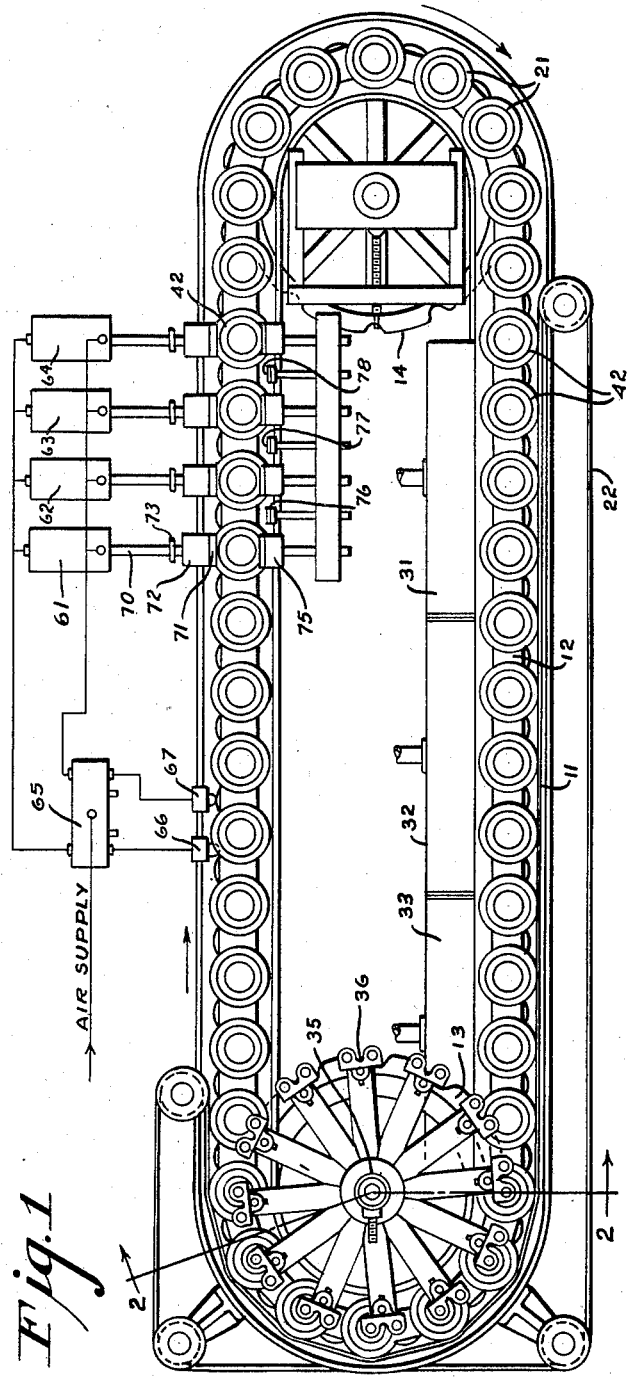
Inventor
WILLIAM R. WISNER
By J. H. Knight
Attorney

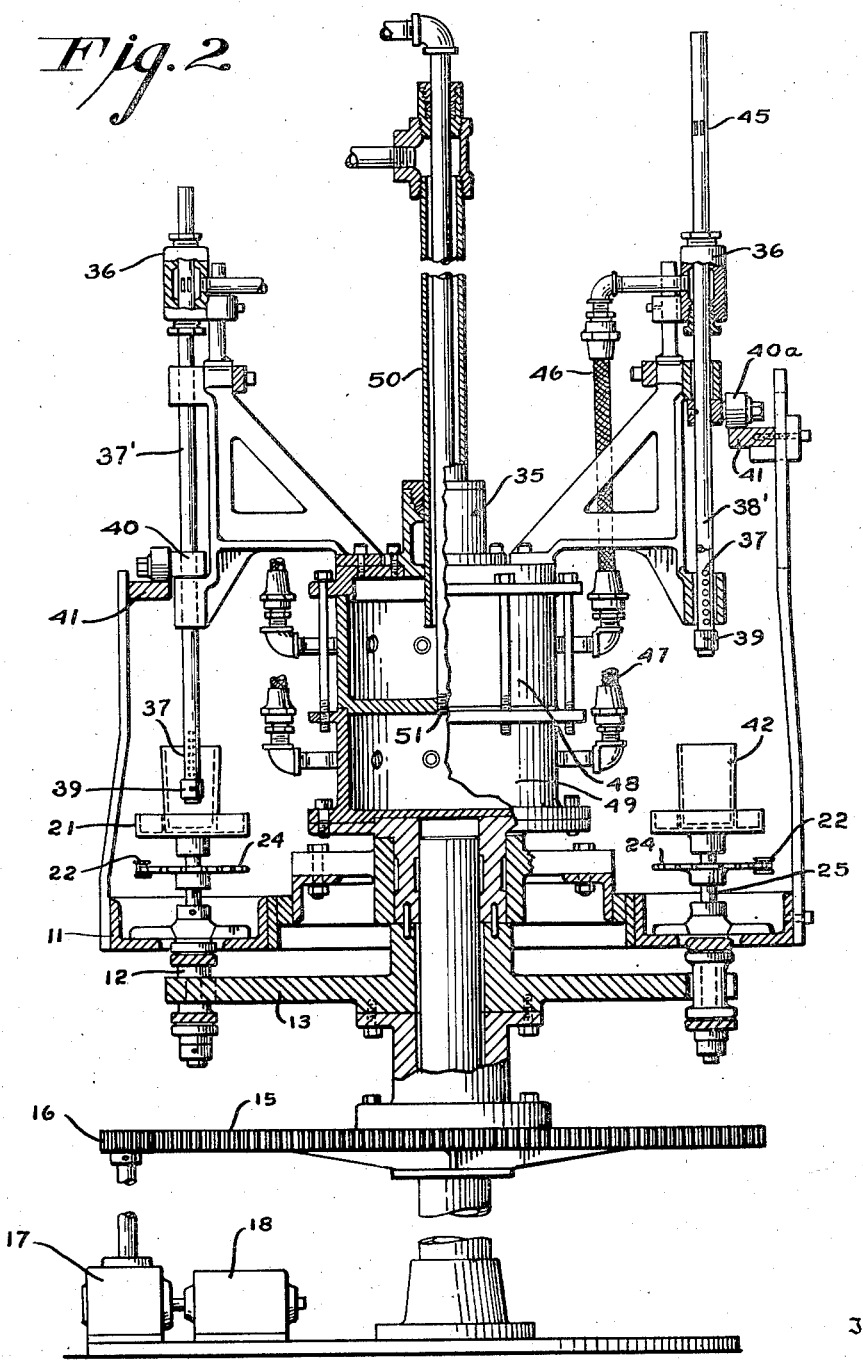

June 5, 1945.    W. R. WISNER    2,377,536
GLASS TEMPERING APPARATUS
Filed Dec. 11, 1941    3 Sheets-Sheet 3
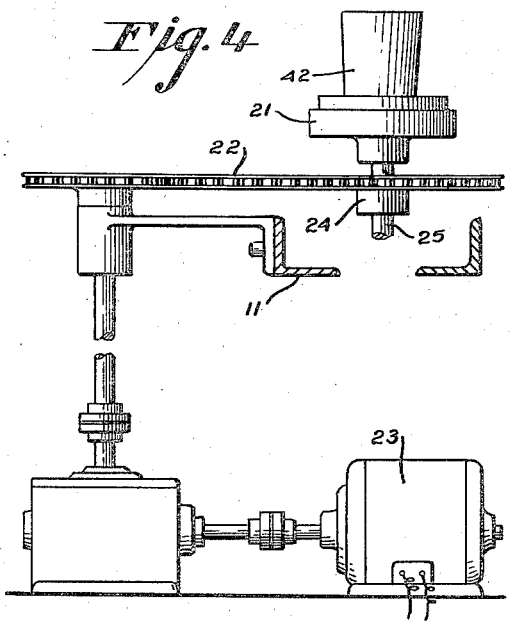
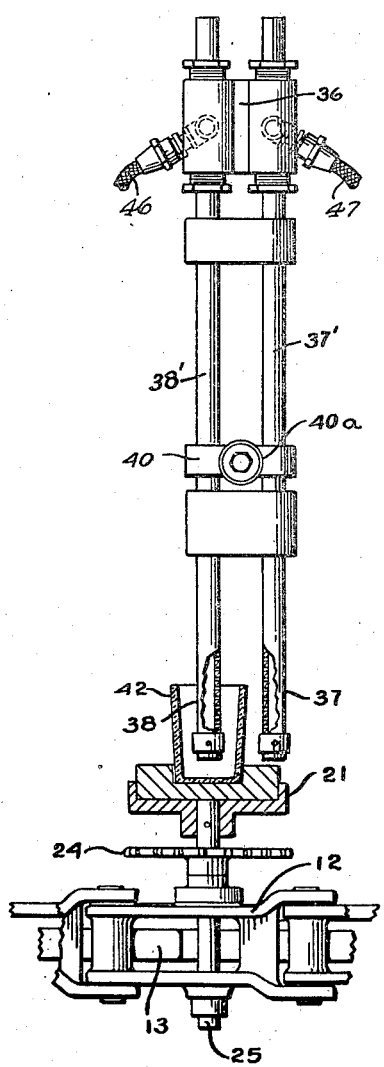
Inventor
WILLIAM R. WISNER
By
F. H. Knight.
Attorney Patented June 5, 1945

2,377,536

UNITED STATES PATENT OFFICE 2,377,536

GLASS TEMPERING APPARATUS

William R. Wisner, Pawtucket, R. I., assignor to Corning Glass Works, Corning, N. Y., a corporation of New York Application December 11, 1941, Serial No. 422,565

2 Claims. (Cl. 49—45)

The present invention relates to apparatus suitable for the treatment of glass articles in a manner to improve their resistance to mechanical and thermal shock.

It is well-known that glass articles of many shapes can be given greater durability by heating them to near their softening point and then suddenly chilling them to below their strain point to set therein permanent stresses so that the surface glass is under compression balanced by an interior zone of glass which is under tension. On the other hand, other shapes of ware, particularly hollow ware, with internal bends of small radii of curvature, are extremely difficult to temper in a manner to produce desired compressive stress conditions in the surface forming the junctions of such bends, with the result that the desired increase in strength may not be attained and in some instances the surfaces forming the junctions of bends may actually be brought under tension so that in these areas the articles will be weaker than the corresponding areas of similar annealed articles.

It has been found however that annealed glass articles of the foregoing forms may be greatly strengthened with a minimum of difficulty by tempering only those parts of zones subjected to the greatest shocks and strains encountered in use. This can be done by first reheating that portion or zone which it is desired to temper until it approaches its softening temperature and then rapidly chilling it to below its strain temperature, thereby setting the glass in a permanent condition of stress such that its surfaces are in compression balanced by an inner portion which is under tension. This process can be performed much more easily than the tempering of the entire article, since the application of heating and chilling media in the desired portions or zones may be determined solely by the production of the desired results in that particular portion or zone without regard for the effect such application might have on the tempering of some other portion of the article which may well be of a configuration rendering proper tempering of the same very difficult.

The prime object of this invention is an apparatus suitable for the treatment of annealed articles in such fashion that their durability is greatly improved.

Another object is an apparatus which not only may be employed to treat articles in a fashion which improves their durability, but also culls out any articles which have failed to suitably respond to the treatment.

In the accompanying drawings the invention has been applied to forms of structure especially suitable for the treatment of annealed glass tumblers and the like.

Fig. 1 is a diagrammatic plan view of the structure;

Fig. 2 is a sectional elevation taken generally along line 2—2 of Fig. 1;

Figs. 3 and 4 are enlarged elevational views of portions of the structure shown in Figs. 1 and 2.

The apparatus illustrated in Figs. 1-4 comprises a suitably supported track 11 carrying a conveyer chain 12 passing around driving and idler sprocket wheels 13 and 14. The chain 12 is continuously driven by means of a gear 15 attached to sprocket wheel 13 and in mesh with a driving pinion 16 extending from a reduction gear unit 17 driven by a variable speed motor 18.

The conveyer chain 12 carries tumbler supports 21 adapted to be rotated about their own axial centers as they progress over a portion of their path of travel. The rotation of tumbler supports 21 after passing about sprocket wheel 14 and until they have also passed about sprocket wheel 13 is effected by means of a chain 22, driven by a variable speed motor 23 (Fig. 4) and engaged by sprocket wheels 24 secured to spindles 25 of the tumber supports. Speed of rotation of the tumblers can thus be varied independent of the speed of the conveyer chain 12. Tumblers to be treated are placed on supports 21 as they are passing about sprocket wheel 14. Suitable burner units 31, 32 and 33 have openings directed toward tumblers 42 carried by supports 21 as they are conveyed from the vicinity of sprocket wheel 14 toward sprocket wheel 13. These burner units are designed to heat the upper portions of tumblers from room temperature to near their softening temperature during the travel of the tumblers past the three burner units.

Arranged above sprocket wheel 13 (Fig. 2) and adapted to rotate therewith is a tumbler chilling turret assembly 35 supporting twelve chilling media feed housings 36 each having a pair of nozzles 37 and 38 (Fig. 3) integral with supporting shafts 37' and 38'. Each pair of shafts 37'—38' is held in fixed relation to one another by a clamp 40 carrying a roller 40a. Each roller 40a rests on a cam track 41 over which the rollers travel as the sprocket wheel 13 is rotated. As a tumbler support 21 starts its travel about sprocket wheel 13 the cam track 41 allows a pair of nozzles 37—38 to be lowered until they straddle the wall of a tumbler 42. In this position air intake ports 45, cut through the walls of shafts 37' and 38', are brought in communication with air supply lines 46 and 47 entering housings 36 so that chilling fluids are directed against the previously heated portions of the tumbler walls. Chilling fluid is supplied to line 46 via a pressure chamber 48 and a main supply line 50, whereas the fluid supplied to line 47 is via a pressure chamber 49 and a main supply tube 51 passing through a portion of supply line 50. As a pair of nozzles 37—38 approaches the location at which the path of the associated tumbler support diverges from that of the nozzles the contour of track 41 is such as to lift the nozzles 37—38 clear of the tumbler.

Separate chilling media supply lines are employed so that the volume of chilling media directed toward the inner and outer surfaces of the tumbler can be modified without changing the number or size of the nozzle openings. The number, size and arrangement of such openings are, however, such as to direct and distribute the cooling media over the glass surfaces as required to set a desired strain condition in the glass when suitable fluid pressures are employed. As a further control on the location and character of the chilling jets each nozzle 37—38 is provided with a collar or collars 39 which can be so shifted and proportioned as to cover one or more of the openings of nozzles 37—38 as desired.

The compressive stresses chilled into the portion of the tumbler adjacent that which remains in its original annealed state must be relatively low to prevent fracture of the tempered portion of the tumbler from the annealed portion. However, the top of the tumbler may have high compressive stresses chilled into its surfaces if the tempered band is of sufficient width to limit the rate of stress gradient between the top and annealed sections of the ware to a value of not to exceed 15 kilograms per square millimeter per centimeter of band width. Such a stress gradient may be produced by heating the zone of the tumbler to be tempered to a uniform temperature and so designing the chilling units as to chill the heated zone progressively less vigorously towards the annealed section. Alternatively, the zone to be tempered may be heated to a predetermined temperature gradient and then subjected to a uniform chilling treatment. Either method of procedure can be carried out successfully by careful control of the application of heat by burner units 31, 32 and 33 and of chilling air by nozzles 37 and 38. The heating of the upper section of the tumbler to the desired gradient temperature can however be accomplished in the most exacting manner by passing the tumblers through a muffle having a desired gradient temperature maintained therein.

As the tumbler supports 21 travel toward sprocket wheel 14 their own drive sprocket wheels 24 leave chain 22 so that their rotation ceases. During the subsequent travel of the supports 21 toward sprocket wheel 14 the ability of the tumblers to withstand mechanical shocks is tested. This test is accomplished by a series of pneumatically actuated hammers 61—64 under control of a master valve 65 and pilot valves 66 and 67.

Each hammer 61—64 includes a piston actatued rod 70 capped with a fibre pad 71 and having a weight 72 freely slidable between pad 71 and a collar 73 so that as a hammer is actuated its pad 71 first engages a tumbler and the pad is then given a hammer blow by the following weight 72 which slides forward by its own inertia on rod 70.

The hammers 61—64 are operated each time pilot valve 66 is tripped and are restored by the tripping of pilot valve 67. The arrangement is such that each tumbler receives a bump from each hammer 61—64. Stops 75 are povided to prevent the hammers 61—64 from driving the tumblers out of their supports. Also, friction pads 76—78 are arranged to engage the supports in passing from alignment with one hammer to another so that the supports are slightly turned and thus present a different wall surface of a tumbler to each of the several hammers.

After testing, the tumblers may be removed and replaced with others to be treated in like fashion.

What is claimed is:

1. In a glass treating apparatus, an endless chain of article supports, means providing a path of travel for said chain having straight and arcuate sections, pairs of article treating nozzles, means providing an arcuate path of travel for said pairs of nozzles over the arcuate section of the path of travel of said supports, means for moving said pairs of nozzles about their path and said supports into and through the arcuate section of their path, a cam under whose control the nozzles of each pair are lowered as they begin their travel over the arcuate section of the path of travel of said supports into association with an article on a support and which raises said nozzles before the support leaves the arcuate section of its path, separate sources of fluid available to said nozzles, and valves arranged in passages between said sources and nozzles opened and closed under control of said cam.

2. In a glass article tempering apparatus, an article support, means providing a path of travel for said support, means for moving said support about its path, means for selectively heating portions of an article on said support while being moved about one portion of its path, a pair of vertically disposed conduits spaced from one another closed at their bottom ends and having outlets directed toward one another for applying chilling fluids against opposite wall surfaces of an article carried by said support, a movable carrier for said conduits providing a path of travel therefor over another portion of the support path, mechanism under whose control said conduits are positioned astraddle the wall of an article while traveling over the latter portion of the path of travel of said support, separate sources of fluid supply available to said conduits, valve means actuated by said mechanism to supply fluid from said sources to said conduits while astraddle an article wall, and means for rotating the article support about its own axis to progressively bring different surfaces of an article between said conduits.

WILLIAM R. WISNER.